United States Patent

Takeda et al.

[11] Patent Number: 6,016,300
[45] Date of Patent: Jan. 18, 2000

[54] OPTICAL PICKUP HEAD APPARATUS

[75] Inventors: Tadashi Takeda; Yoshio Hayashi, both of Nagano; Hideo Takezoe, Tokyo; Ken Ishikawa, Nagano, all of Japan

[73] Assignee: Sankyo Seiki Mfg. Co., Ltd., Nagano-ken, Japan

[21] Appl. No.: 09/114,602

[22] Filed: Jul. 13, 1998

Related U.S. Application Data

[62] Division of application No. 08/665,764, Jun. 19, 1996, Pat. No. 5,828,643.

[30] Foreign Application Priority Data

Jun. 20, 1995 [JP] Japan ................................. 7-176666
Jun. 20, 1995 [JP] Japan ................................. 7-176667

[51] Int. Cl.[7] ............................................. G11B 7/00
[52] U.S. Cl. ............................................. 369/103; 369/112
[58] Field of Search ........................... 369/44.14, 44.24, 369/44.41, 100, 103, 109, 110, 112, 116, 118, 124

[56] References Cited

U.S. PATENT DOCUMENTS 5,659,531   8/1997   Ono et al. ........................... 369/103 X

FOREIGN PATENT DOCUMENTS 7-287116   10/1995   Japan .

*Primary Examiner*—Paul W. Huber
*Attorney, Agent, or Firm*—McAulay Nissen Goldberg Kiel & Hand, LLP

[57] ABSTRACT

An optical pickup head apparatus for reading information signals from a recording medium having a laser beam light source, an objective lens and a photodetector, the improvement comprises a holographic optical element constructed of a pair of diffraction gratings having different diffractive conditions wherein the element is split into two by a split line near its optical axis as a border and a diffraction generation prevention device for preventing the generation of unwanted diffracted beams from a recording medium. The optical pickup head apparatus irradiates a laser beam emitted from the light source onto a recording medium via the holographic optical element and the objective lens. Beams reflected from the recording medium are guided to the photodetector via the objective lens and the holographic optical element.

11 Claims, 13 Drawing Sheets

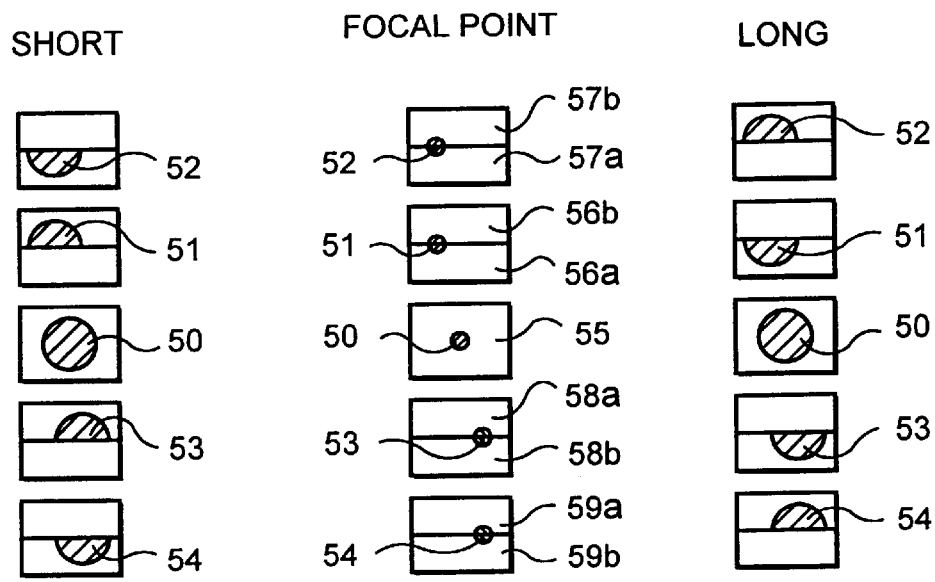
F I G. 5a     F I G. 5b     F I G. 5c
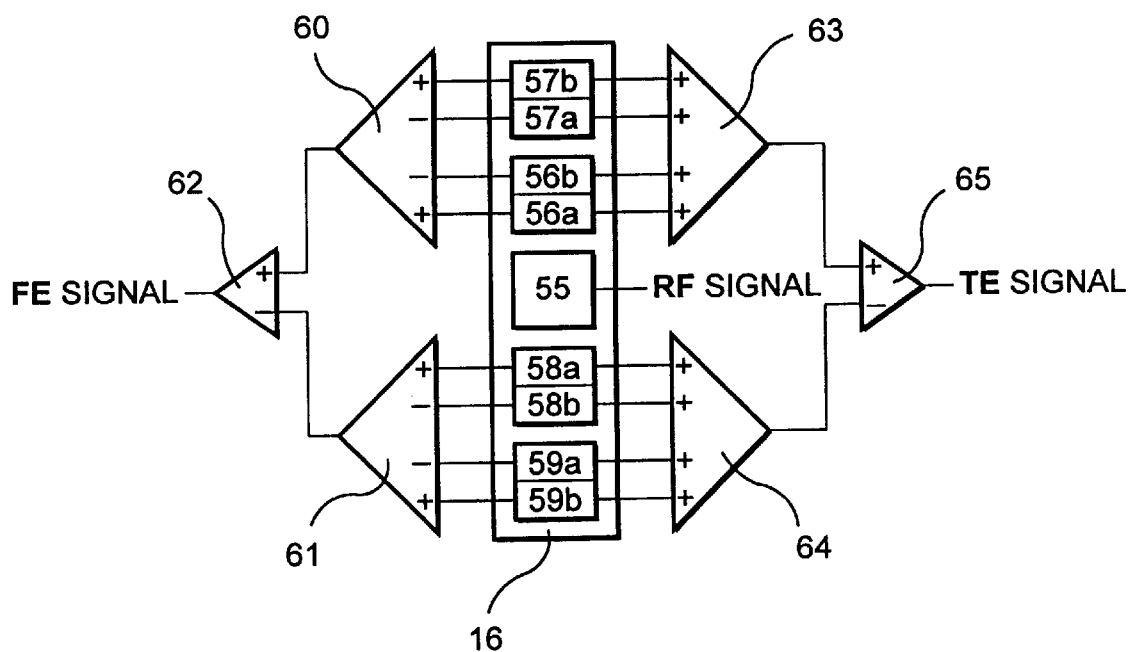
F I G. 6

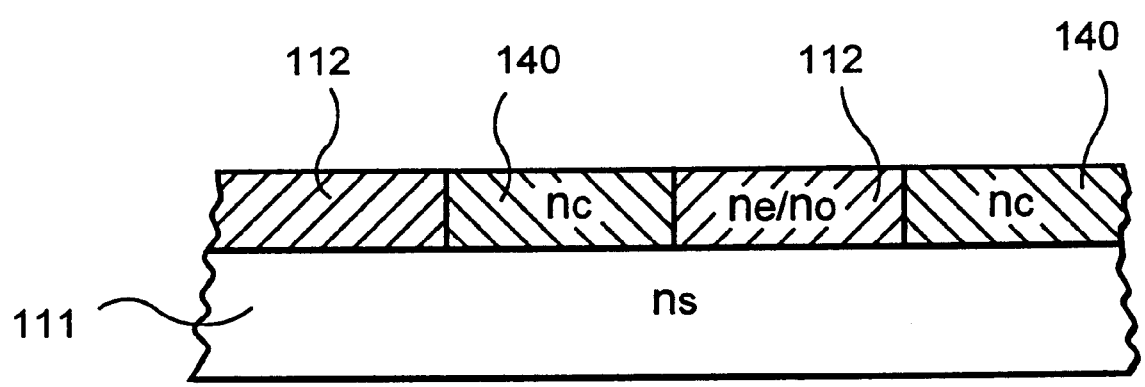
F I G. 12

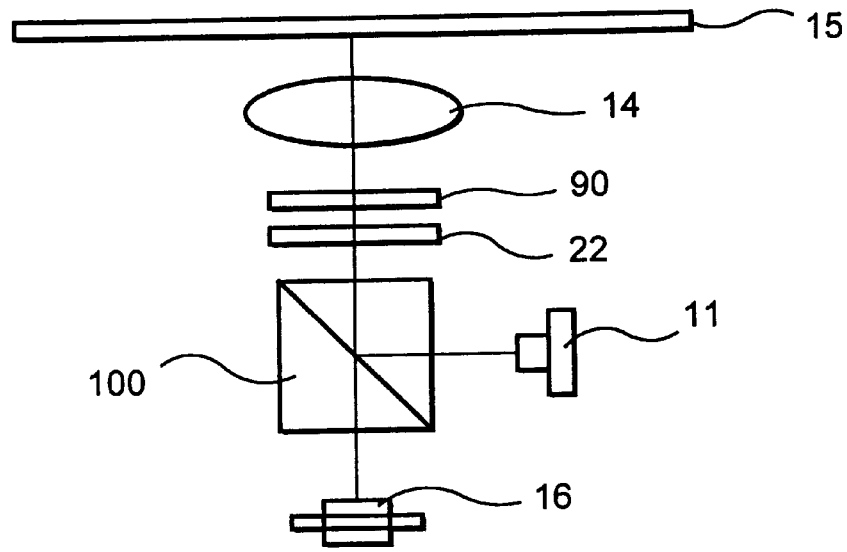
F I G. 13
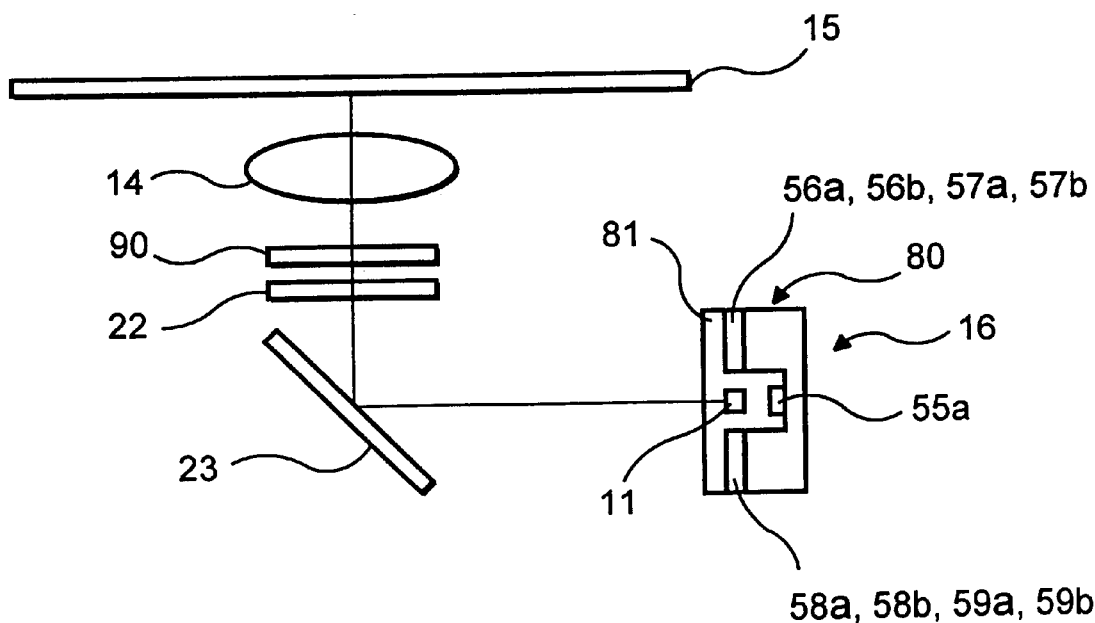
F I G. 14

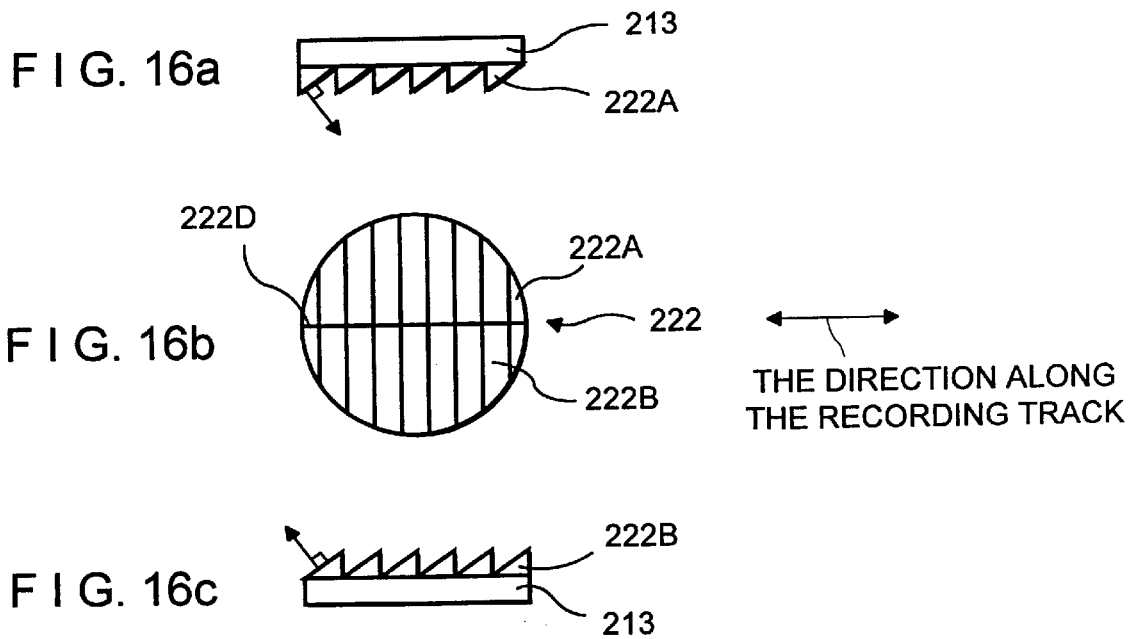
FIG. 16a
FIG. 16b
FIG. 16c
THE DIRECTION ALONG THE RECORDING TRACK
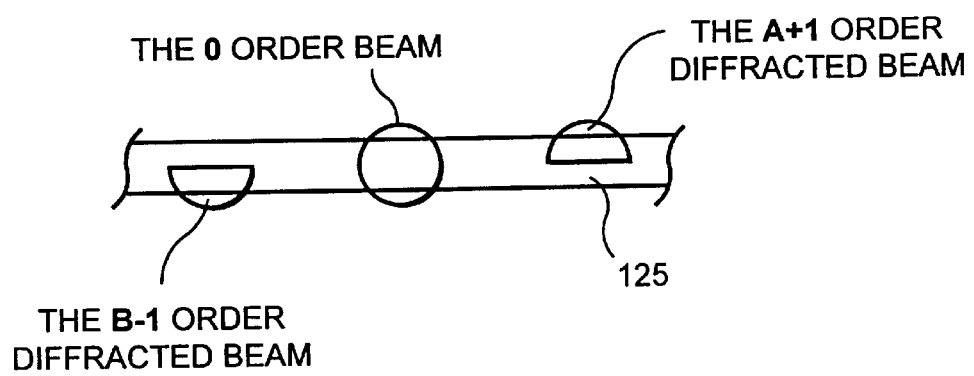
FIG. 17

○ A+I/B-I
○ O/B-I
○ A+I/O
○ O/O
○ O/A+I
○ B-I/O
○ B-I/A+I

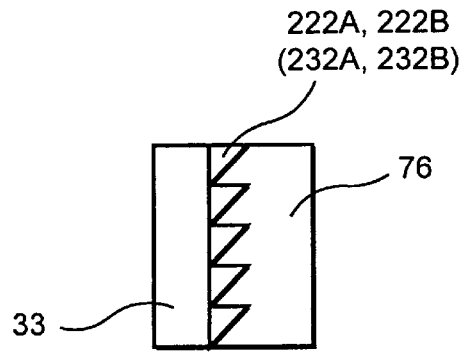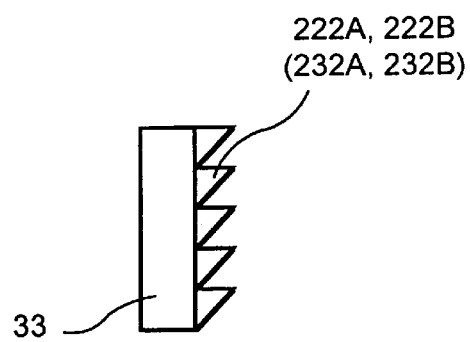
FIG. 23a  FIG. 23b
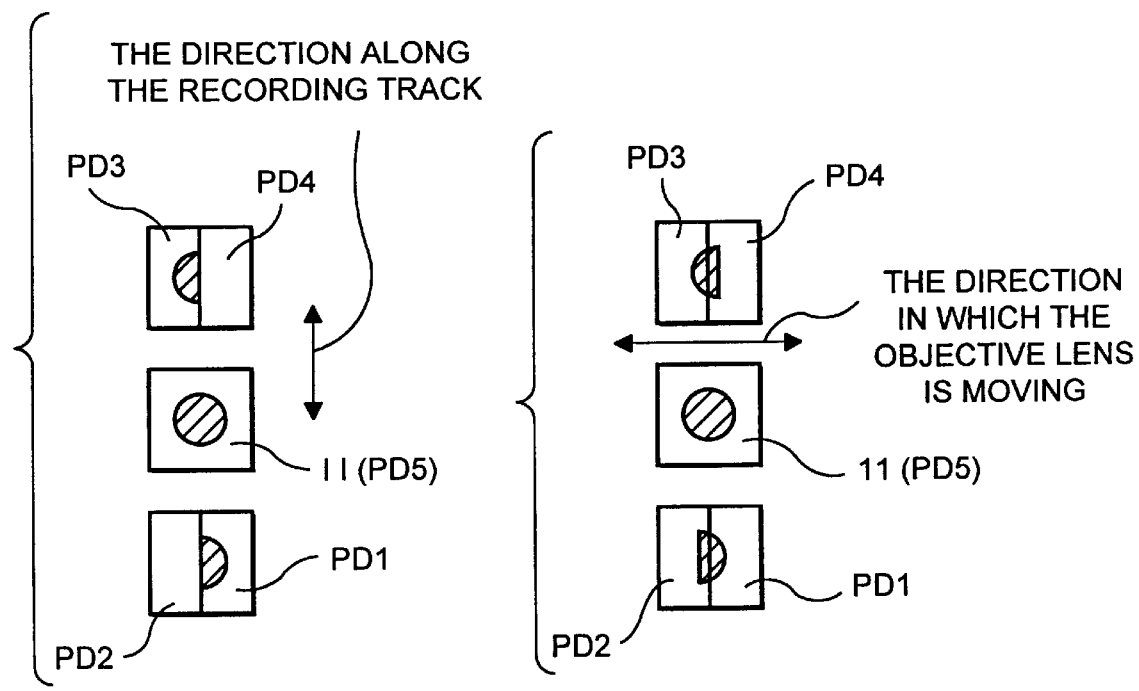
FIG. 24a  FIG. 24b

OPTICAL PICKUP HEAD APPARATUS

This application is a division of application Ser. No. 08/665,764, filed Jun. 19, 1996, now U.S. Pat. No. 5,828,643.

BACKGROUND OF THE INVENTION a) Field of the Invention

This invention relates to an optical pickup head apparatus for reading information from an information recording medium such as a laser disk.

b) Description of the Related Art

For example, the information saved on a compact disk is stored in the form of bit tracks (tracks) formed on a disk surface. The three beam method and the astigmatism method are commonly used for an optical pickup head apparatus which reads recorded information.

An optical pickup head apparatus using the three beam method or astigmatism method works in the way that a beam emitted from a light source (semiconductor laser) passes through a diffraction grating structured with a holographic optical element and a beam splitter, and, then, is condensed by an object lens; a coherent beam is irradiated at an information track (bit track) of the disk; its reflection is guided to a photodetector comprising a six division photodetector element via the objective lens, beam splitter, and cylindrical lens.

In the three beam method, a beam emitted from a light source is split by the diffraction gratings, into three beams which are the 0 order and ±1 order beams and condense them so that three beam spots are arranged at positions slightly angled from an information track. Then, a servo computation is implemented to make the levels of reflection signals (sub-beam signal) from the ±1 order spots on sides equal. That is, the sub-beam signals from the ±1 order spots are detected by each photodetector element; the difference in output at each photodetector element is computed by subtraction apparatus to obtain a tracking error (TE) signal; the tracking error is servo computed to locate 0 order spot in the center of the track.

The astigmatism method generates astigmatism by the cylindrical lens in the beam of reflected light from the disk surface. A change in spot shape (elliptical direction and elipticallity) caused by misfit focus is computed by adding the outputs of diagonal photodetector elements of a four division photodetector element (the photodetector element which detects the 0 order beam) arranged between a two division photodetector element while obtaining the sum of the output from photodetector elements positioned diagonally by an adding apparatus while obtaining the difference in output from each adding apparatus by a subtracting apparatus to detect a focus error (FE) signal. A radio frequency (RF) signal which is a data signal is obtained by totaling the outputs of the four division photodetector element.

The aforementioned optical pickup head apparatus obtains a radio frequency (RF) data signal by totaling a four division photodetector element such that the center of the signal beam spot, where light beam energy is dense, is located on a split line (dead zone) of the four division photodetector element and the radio signal output fluctuates due to the increase or decrease of the diameter of the spot or due to the spot moving its location. That is, a problem was encountered in that the lens actuator for controlling tracking and focusing invites fluctuation of output signals.

OBJECT AND SUMMARY OF THE INVENTION

Therefore, the primary object of the present invention is to configure an optical pickup head apparatus that eliminates the influence of a dead zone in the photodetector. A further object is to prevent generating unwanted diffraction of beams even when it is configured for the beam to pass through a holographic optical element twice, when interrogating and returning, and consequently to improve accurate detection of error signals and light beam energy efficiency.

In accordance with the invention, in an optical pickup head apparatus for reading information signals from a recording medium having a laser beam light source, an objective lens and a photodetector, the improvement comprises a holographic optical element constructed of a pair of diffraction gratings having different diffractive conditions wherein the element is split into two by a split line near its optical axis as a border and a diffraction generation prevention means for preventing the generation of unwanted diffracted beams from a recording medium. The optical pickup head apparatus irradiates a laser beam emitted from the light source onto a recording medium via the holographic optical element and the objective lens. Beams reflected from the recording medium are guided to the photodetector via the objective lens and the holographic optical element.

For a better understanding of the present invention, reference is made to the following description and accompanying drawings while the scope of the invention will be pointed out in the appended claims.

BRIEF DESCRIPTION OF THE DRAWINGS

In the drawings:

FIGS. 5(a), 5(b) and 5(c) are diagrams illustrating the status of beam spots on a photodetector surface of a photodetector element which constitute a photodetector;

FIG. 6 is a circuit diagram illustrating the status of interconnections to obtain RF, FE, and TE signals from the output of each element of a photodetector;

FIG. 12 illustrates a side-cross section of another example of a holographic optical element of this invention;

FIG. 13 illustrates a basic configuration of the optical pickup head apparatus of the second example of this invention;

FIG. 14 illustrates a basic configuration of the optical pickup head apparatus of the third example of this invention;

FIG. 16 illustrates a top view (a), a front view (b), and a bottom view (c) of a holographic optical element of another example of this invention;

FIG. 17 is a plan view illustrating the status of the beam spots irradiated on a disk surface by means of the holographic optical element of FIG. 16;

FIGS. 23(a) and 23(b) are diagrams illustrating an example of manufacturing a holographic optical element;

FIGS. 24(a) and 24(b) are diagrams illustrating the principles of moving spots and off-setting focus at the photodetector when the wave length from a light source fluctuates;

DESCRIPTION OF THE PREFERRED EMBODIMENTS

Figure 1:
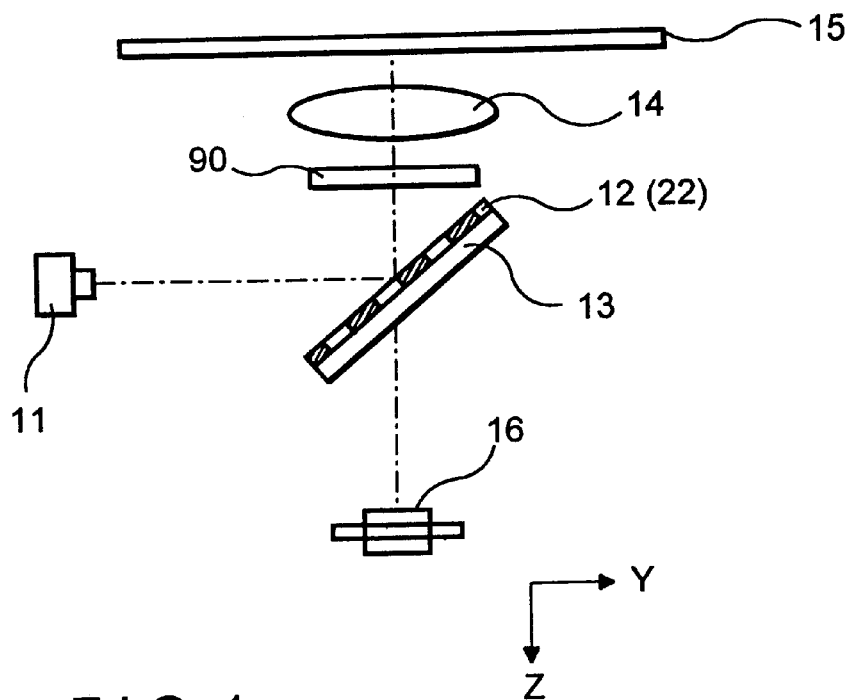
FIG. 1 a illustrates basic configuration of an optical pickup head apparatus of the first example of this invention.

FIG. 1 is a schematic configuration of an optical pickup head apparatus of the first example of this invention. First of all, positional relationships for convergent light beams passing through a holographic optical element of this invention are described, assuming for convenience that the λ/4 plate 90 in the figure is not present.

This optical pickup head apparatus is configured so that the side of the incidence plane of a half mirror 13, for example, which functions as a beam splitter, is formed integral with a holographic optical element 12 which splits a beam emitted from a semiconductor laser 11. That is, the beam emitted from the semiconductor laser 11 is split into a plurality of beams by means of the holographic optical element 12; the split beams are guided to an objective lens 14 via the beam splitter 13 and are focused on the recording surface of a laser disk 15 as a plurality of beam spots. Each of the plurality of beam spots is reflected back to the laser disk 15 and passes through the objective leans 14 again to be re-imaged on a focal plane on the side of a photodetector 16 via the holographic optical element 12 and the beam splitter 13.

Figure 2:
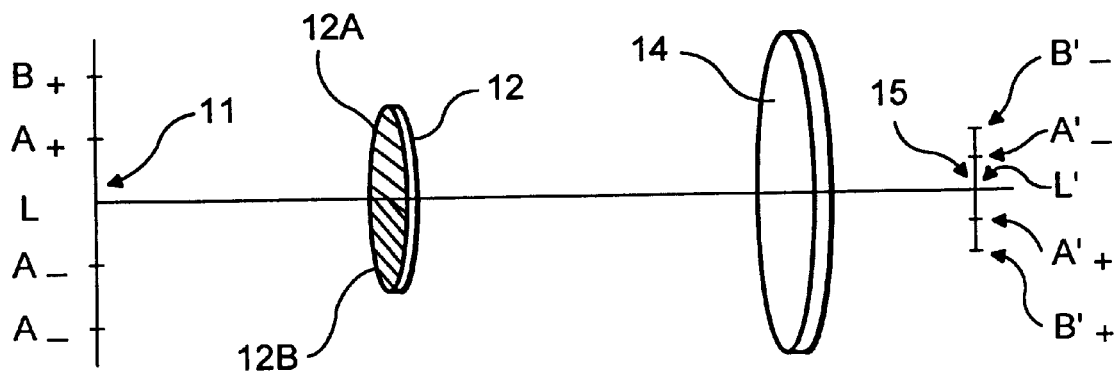
FIG. 2 is a conceptual drawing describing how laser beams are focused on a recording surface of a disk surface through a holographic optical element.
Figure 3:
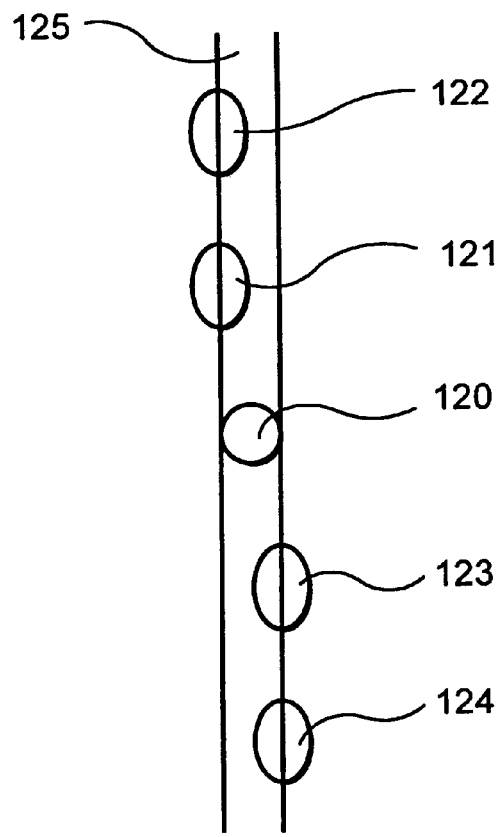
FIG. 3 illustrates a plan view showing the status of five beam spots on a disk surface.
Figure 4:
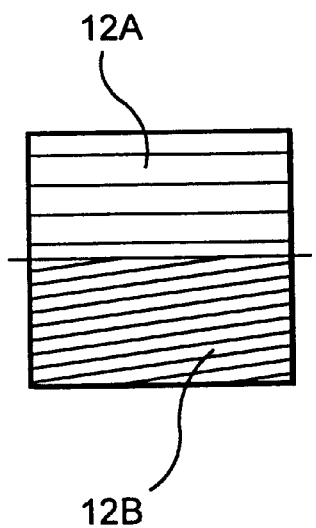
FIG. 4 illustrates a schematic diagram describing the grating pattern of a holographic optical element.

As illustrated in FIG. 2 and FIG. 4, the above mentioned holographic optical element 12 is split by a line generally on the optical axis in the direction orthogonal to a medium track direction. This dividing line is normally spotted widely so that the diffracted beams A'± and B'± on the laser disk 15 of FIG. 2 widely spot in that at least the diffracted beam A'± crosses the edges of a track 125 as illustrated by beam spots 121 and 123 in FIG. 3. The holographic optical element comprises a pair of diffraction gratings (concavo-convex gratings) having different diffraction conditions on each side of the split line. That is, it has diffraction gratings 12A and 12B of different grating distances and directions to differentiate the diffraction conditions for both sides of the dividing line.

First of all, referring to the principal diagram of FIG. 2, it is clearly described that positions on a recording surface are converged by means of the holographic optical element. The 0 order diffracted beam (O order beam) is converged as a main beam for reading bit signals; the ±1 order diffracted beam (±1 order beam) is converged as a sub-beam for detecting focusing error and tracking error. Among optical beams emitted from the semiconductor laser 11 and incident on the upper diffraction grating 12A as illustrated in FIG. 2, the 0 order beam, not being diffracted, passes through the diffraction grating 12A and is reflected at the beam splitter 13 (not illustrated in FIG. 2). It enters the objective lens 14 and is converged at a point L'. On the other hand, the ±1 order diffracted beams enter the objective lens 14, as if light sources are virtual images A+ and A− which are symmetrical to the optical axis with respect to the point L of the semiconductor laser 11, and are converged at the points A'+ and A'−. In other words, for the 0 order beam, the optical beam emitted from the diffraction grating 12A is converged by the objective lens 14 at the point L' which conjugates with the point L; for the ±1 order beam, A+ and A− conjugate with A'+ and A'− on each corresponding conjugated point on a recording surface.

The same logic is applied to the beam emitted from the semiconductor laser 11 and which enters the diffraction grating 12B on the lower side of FIG. 2. The 0 order beam is converged at the conjugating point L' which is conjugated with L; the ±1 order beams B+ and B−, are converged at their conjugating points B'+ and B'−. Therefore, the beam emitted from the semiconductor laser 11 turns into the 0 order and ±1 order diffracted beams by means of the diffraction gratings 12A and 12B which is the upper and lower sides of the holographic optical element 12; it is reflected at the beam splitter 13 and passes through the objective lens 14 to be converged at 5 beam spots consisting of L', A'+, A'−, B'+, and B'− on the recording surface of the laser disk 15.

FIG. 3 illustrates how beam spots look like when viewed from the direction perpendicular to the recording surface of the laser disk 15. The beam spot 120 in the center of the track 125 is the 0 order beam; other four beams are the ±1 order beams. The ±1 order beam spots 121 and 123 created by means of the diffraction grating 12A are symmetric with respect to the center beam spot 120; ±1 order beam spots 122 and 124 created by means of the diffraction grating 12B are symmetric with respect to the center beam spot 120 as well. Each ±1 order beam can be converged on an appropriate location on the track by means of determining the grating distance and direction for each of the diffraction gratings 12A and 12B with regards to spot locations. In addition, the general shape of the ±1 order beam spot is obtained by the Fourier transform for each diffraction grating opening shape.

Next, the beam spot on the photodetector 16 is described. The above mentioned five beam spots on the laser disk 15 are reflected at the laser disk 15 and pass through the objective lens 14 again; all the laser beams which passed through the objective lens 14 are detected by means of the photodetector 16, such as the 0 order transmission beam which passed through the holographic optical element 12 and the beam splitter 13.

Then, the positional relationship for the beam spots on the focal plane surface at the side of the photodetector 16 is conjugated as the positional relationship for the five beam spots on the recording surface. Therefore, the photodetector 16 is constructed of five photodetector elements, as illustrated in FIG. 5, according to the five beam spots. Each of (a), (b), and (c) of FIG. 5 demonstrates a different detecting status.

When the positional relationship between the objective lens 14 and the laser disk 15 moves along the optical axial direction or perpendicular to the optical axial direction, the spot shapes and spot positions change the same as those on the recording surface and the focal plane at the side of the photodetector. The change in the positional relationship between the objective lens 14 and the laser disk 15 in the optical axial direction, that is, the change in the beam spots on the photodetector 16 with respect to the focusing error is illustrated in FIGS. 5(a), (b) and (c).

At the focal point, as illustrated in FIGS. 5(a), (b) and (c), the beam spots 51 and 53 for the ±1 order diffracted beams passing through the diffraction grating 12A and the beam spots 52 and 54 for the ±1 order diffracted beams passing through the diffraction grating 12B are on the upper and the lower positions when the 0 order beam spot 50 is in the center; all beams form the smallest beam spots. Moreover, the beam spot 50 is positioned in the center of the photodetector element 55; the centers of the beam spots 51 to 54 for the ±1 order diffracted beams are on the split line of the two-division photodetector elements 56a.56b to 59a.59b aligned in a row on both sides of the photodetector element 55.

When the distance between the objective lens 14 and the laser disk 15 is short, the 0 order beam spot 50 does not change its position, as illustrated in FIG. 5(a), but its diameter becomes larger; the center of the ±1 order diffracted beam spots 51 and 53 passing through the diffraction grating 12A move to the upper side of FIG. 5 while they grow to look like the opening shape of the diffraction grating 12A; the center of the ±1 order beam spots 52 and 54 passing through the diffraction grating 12B move to the lower side of FIG. 5 while they grow to look like the opening shape of the diffraction grating 12B; most of the ±1 order diffracted beam spots 51 to 54 are located at one side of each split line of the two division photodetector elements 56a.56b to 59a.59b. Note that FIGS. 5(a), (b) and (c) illustrate the ideal status; therefore, the beam spots are located on one side only. In reality, a part of the beam spot can be located on the other side crossing the border due to a blur and the like.

On the other hand, when the distance between the objective lens 14 and the laser disk 15 is long; the 0 order beam spot 50 does not change its position, as illustrated in FIG. 5(c) but its diameter becomes larger; the center of the ±1 order diffracted beam spots 51 and 53 passing through the diffraction grating 12A move to the lower side of FIGS. 5(a), (b) and (c) while they grow to look like the opening shape of the diffraction grating 12A turned up side down; the center of the ±1 order beam spots 52 and 54 passing through the diffraction grating 12B move to the upper side of FIGS. 5(a), (b) and (c) while they grow to look like the opening shape of the diffraction grating 12B turned up side down.

Therefore, by arranging the outputs of each of the photodetector elements 55 and 56a.56b to 59a.59b which constitute the photodetector 16 as illustrated in FIG. 6, FE and TE signals are obtained. That is, the focusing error signals, FE, are obtained by comparing the outputs from the two division photodetector elements 56a.56b and 57a.57b and those of the two division photodetector elements 58a.58b and 59a.59b turning the outputs up side down via comparators 60 and 61, which are interconnected with a comparator 62 for comparing the results. FE signals obtained by this method have an advantage in that they are is independent from the frequency fluctuation of the semiconductor laser 11 and the subsequent effect of the frequency fluctuation on the FE signal is canceled through comparison.

On the other hand, when detecting the tracking error in the positional relationship between the objective lens 14 and the laser disk 15, the same procedure as in the normal 3-beam method is used. As illustrated in FIG. 6, the tracking error signal, TE signals, are obtained by adding the outputs from the two division photodetector elements 56a.56b and 57a.57b and those of the two division photodetector elements 58a.58b and 59a.59b via adding devices 63 and 64, which are interconnected with the comparator 65 for comparing the results. Note that TE signals can be obtained with the outputs from two division photodetector elements 56a.56b and 58a.58b or the two division photodetector elements 57a.57b and 59a.59b.

Regarding detecting RF signals, the 0 order diffracted beam only increases or decreases its diameter according to the focusing level while the beam spot always stays on the photodetector element 55 of the photodetector 16. Therefore, the influence from the split line on the photodetector elements that the conventional technology encountered, is not observed.

Because the laser beams pass through the holographic optical element 12 twice in the optical pickup head apparatus when interrogating and returning, diffraction is encountered not only when it is interrogating but also when it is returning. In this case, as illustrated in FIG. 7, the beam spots overlap on the side of the photodetector and the accuracy in detecting error signals decreases.

Figure 7:
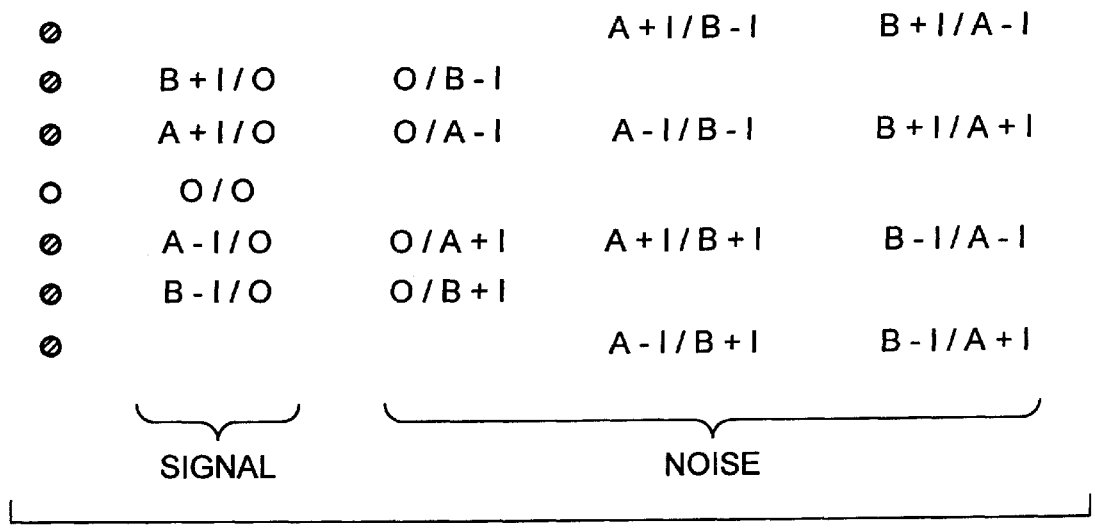
FIG. 7 is a diagram illustrating the overlapping status of beam spots on the side of a photodetector in the above first example.

This unwanted overlap of the diffracted beam spots is described referring to FIG. 7. Numerators of the fractions in which symbols are indicated indicate the 0 order and ±1 order interrogating beams; denominators indicate the 0 order and ±1 order diffracted beams; for example, 0/0 indicates the 0 order interrogating and returning beams; A+1/0 indicates the +1 order interrogating diffracted beam passing through the diffraction grating 12A and the 0 order returning diffracted beam passing through the diffraction grating 12A respectively; B+1/A−1 indicates the +1 interrogating diffracted beam passing through the diffraction grating 12B and the −1 returning diffracted beam passing through the diffraction grating 12A respectively. Therefore, there are 17 combinations between the 0 order and ±1 order diffracted beams for both ways. In this example, the grating pitch for the diffraction grating 12B is half of that of the diffraction grating 12A. As illustrated in FIG. 7, on the side of the photodetector, a beam spot illustrated in a normal circle (showing 0/0) and other beam spots in black circle are formed. In other words, six beam spots are formed other than the normal beam spot (0/0), and all the beam spots illustrated in black circle encounter overlaps; consequently, decreasing accuracy in detecting error signals.

To resolve the problem, this invention uses a diffraction generation counter measure between the recording medium and the holographic optical element including the holographic optical element to prevent generating unwanted diffracted beams caused by the reflection from the recording medium. Specifically, a λ/4 plate 90 is formed and a holographic optical element 22 as illustrated in FIG. 8, is used in place of the holographic optical element 12 to control degradation of accuracy in detecting the error signals.

Figure 8:
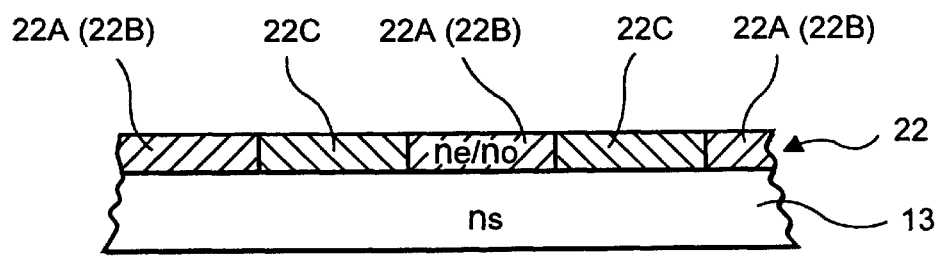
FIG. 8 is a side-cross section illustrating an example of a holographic optical element for the holographic optical element of the above first example.

That is, in FIG. 8, code 13 indicates, for example, a half mirror which functions as the beam splitter as mentioned above; an orientation layer of rutile phase titanium oxide (rutile type titanium oxide) is formed on the surface of the half mirror 13. This rutile type titanium oxide oriented layer is split into two near the optical axis by a split line; in each domain, the gratings 22A and 22B having periodic concavo-convex gratings. The bottom of the concavity of the oriented rutile type titanium oxide layer is so deep that it reaches the surface of the half mirror 13. These periodic gratings 22A and 22B have different diffraction conditions demonstrating the same grating pattern as illustrated in FIG. 4. That is, these periodic gratings 22A and 22B are given the function to split a beam into five beams by means of diffracton.

In addition, in the concavity of the rutile type titanium oxide oriented layer, that is, in the domain enclosed by the sides of the rutile type titanium oxide oriented layer and the surface of the half mirror 13, a substance 22C having a refractive index (nc) which is equal to index (ne) which is an extraordinary refractive index of the titanium oxide oriented layer against extraordinary light, is filled. Therefore, an extraordinary light does not diffract because there is no refractive index difference therein; an ordinary light generates a diffracted beam because it encounters a refractive index differential therein and the grating works as a phase grating. In other words, the holographic optical element 22, illustrated in FIG. 8, diffracts a specific polarized component (an ordinary component in the above description) but it transmits a polarized component (an extraordinary component in the above description) which is orthogonal to the polarized component because the diffraction function does not work for it.

The holographic optical element 22 is arranged to be split into two near the optical axis to have a pair of diffraction gratings 22A and 22B having different diffraction conditions with a border at the split line; and they are arranged to diffract the polarized component emitted from the light source. Therefore, when a beam (linear polarization) emitted from the semiconductor laser 11 passes through the holographic optical element 22, one diffraction grating 22A provides the 0 order and, for example, the A±1 order beams while the other diffraction grating 22B provides the 0 order and, for example, the B±1 order beams, thus five beams in total are provided. When these five beams pass through the λ/4 plate 90, the linearly polarized beams are, for example, circularly polarized clockwise; these beams polarized circularly and turned clockwise are condensed to be five beams on the disk 15 through the objective lens 14. The returning beam from the disk 15 is circularly polarized counterclockwise, and pass through the objective lens 14 to reach the λ/4 plate 90; the returning beam is linearly polarized with a polarized surface and are rotated by 90° when passing through the λ/4 plate 90. When this linearly polarized beam with its polarized surface rotated by 90° reaches the holographic optical element 22, the five beams transmit without diffraction because the holographic optical element 22 transmits only the polarized component having the polarized surface rotated by 90°. In this way, only an interrogating beam diffracts; a returning beam does not diffract as it did before; the transmitted beams are condensed by the photodetector 16 through the half mirror 13.

Therefore, the status of the beam spots on the photodetector surface of the photodetector element of the photodetector is the same as described in FIG. 5; with circuits described in FIG. 6, each of the RF, FE, and TE signals is obtained. That is, in this example, the photodetector dead zone no longer affect signal detection. A signal detection with little fluctuation, excellent in jittery property, is made possible.

Note that, in this example, the optical pickup head apparatus is configured to decrease the number of components and simplify its structure by forming the holographic optical element 22 on the half mirror 13 and forming the holographic optical elements 22 integral with the half mirror 13. This configuration reduces manufacturing cost and increases productivity.

In addition, the holographic optical element 22 is made from rutile type titanium oxide; however, materials are not limited to rutile type titanium oxide. For example, the holographic optical element 22 can be made from polydiacelylene, calcite, quartz, or lithium niobate. Note that among these inorganic materials, rutile type titanium oxide (a birefringent material) has a larger refractive index difference between ordinary and extraordinary lights compared to other inorganic materials such as the calcite, quartz, and lithium niobate, providing the advantage in that the holographic optical element 22 can be made thin. Also, rutile type titanium oxide has an advantage in environmental resistivity compared to organic materials such as the polydiacetylene. That is, the rutile type titanium oxide does not deteriorate under a high temperature environment, is stable when exposed to ultraviolet rays and the like, and is resistant to physical stress.

The configuration of the holographic optical element 22 of the example is not limited to that in which the holographic optical element 22 diffracts a specific polarized component but it transmits a polarized component which is orthogonal to the polarized component because it is not functional to the component. The configuration may be replaced with another one.

Figure 9:
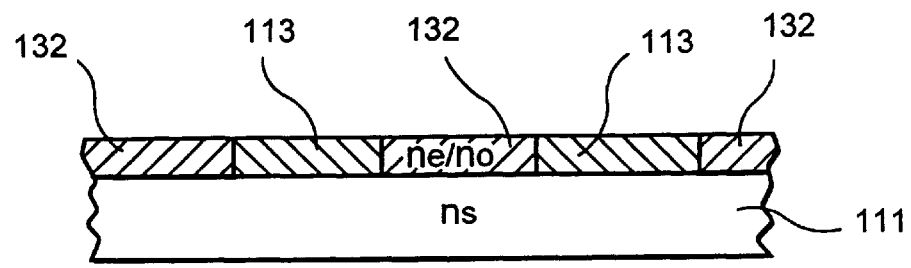
FIG. 9 illustrates a side-cross section of another example of a holographic optical element of this invention.

FIG. 9 illustrates a holographic optical element of another configuration. A quartz 132 is formed as a birefringent material layer on the surface of the isotropic substrate 111 made of soda glass with a refractive index (ns) of 1.51. Periodic concavo-convex gratings are formed on the quartz 132. The refractive index (no) of this quartz to ordinary light is 1.52; the refractive index (nc) of this quartz to extraordinary light is 1.48. By filling the concavity with an acrylic resin 113, for example, of the refractive index (nc) of 1.48, which is equal to the refractive index (ne) of the quartz to extraordinary light, a holographic optical element, which does not diffract extraordinary light due to the absence of refractive index difference may be obtained.

Figure 10:
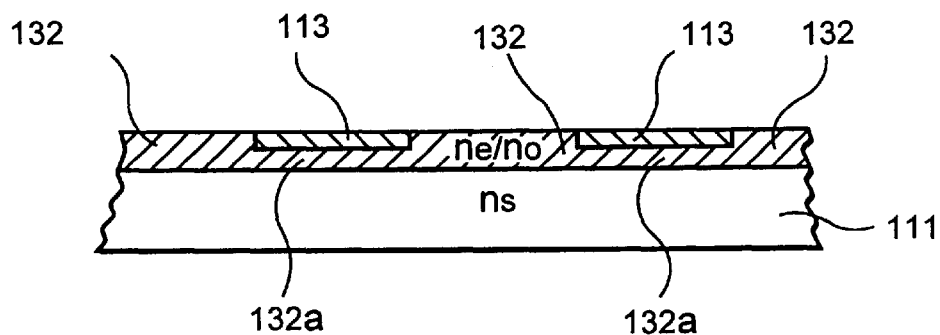
FIG. 10 illustrates a side-cross section of another example of a holographic optical element of this invention.

FIG. 10 illustrates a holographic optical element of another configuration. Unlike the configuration in FIG. 9, the bottom of the concavity of the quartz 132 does not reach the surface of the glass substrate 111 to leave a predetermined thickness. An acrylic resin 113 is filled in the concavity so that no refractive exists for extraordinary light to provide a holographic optical element which does not generate diffracted beams.

Note that in the above FIGS. 9 and 10, an acrylic resin 113 of the refractive index (ne)=1.48, which is equal to the refractive index of the quartz to extraordinary light, is filled in the concavity of the quartz 132; however, the substance of the refractive index (no) of 1.52, which is equal to the refractive index of the quartz to ordinary light, may be filled therein. In this case, diffracted beams are generated for extraordinary light because there is a difference in refractive indexes between the quartz and the substance. No diffracted beam is generated for ordinary light because there is no difference in refractive indexes therein.

Figure 11:
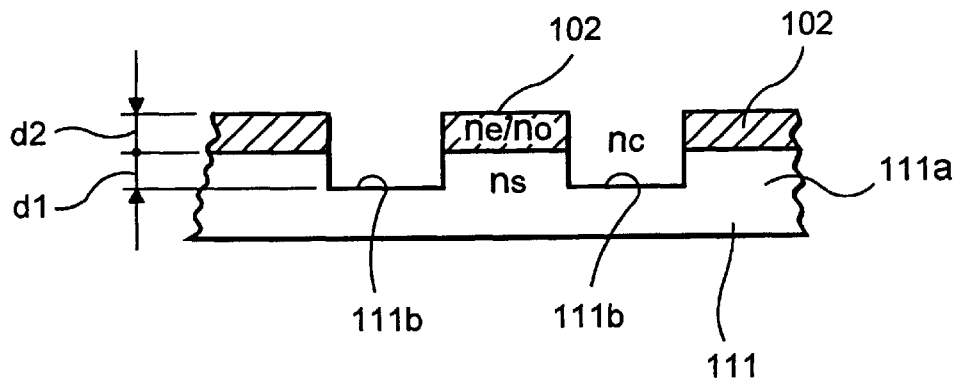
FIG. 11 illustrates a side-cross section of another example of a holographic optical element of this invention.

In addition, as illustrated in FIG. 11, the holographic optical element can be configured such that the concavity 111b, formed with the optically isotropic substrate 111 and a birefringent material layer, is configured to be filled with a substance having a refractive index equal to either ordinary light, or extraordinary light wherein the optically isotropic substrate 111 has periodic concavo-convex gratings formed on its surface, and a birefringent layer 102 formed with a birefringent material at least on the convexity 111a of the optically isotropic substrate 111. Also, as described in our Japanese patent application, Hei 6-100668 in detail, the holographic optical element can be configured in such a way that the thickness d2 for the birefringent material layer 102 and a depth d1 for the concavity formed on the optically isotropic substrate 111 are set to make one of the phase contrasts an even multiple of $\pi$, wherein the phase contrasts for ordinary and extraordinary lights exist between the concavity 111b and the convexity formed with the optically isotropic substrate 111 and birefringent material layer 102, while the polarized component of a returning beam transmits. In the example, a glass substrate is used for the optically isotropic substrate; lithium niobate is used for the birefringent material; however, this is not intended to limit other possibilities.

As illustrated in FIG. 12, periodic concavo-convex gratings made from a birefringent material 112 made from lithium niobate may be formed on an optically isotropic glass substrate 111; the periodic concavity of periodic concavo-convex gratings, may be configured to be filled with a filling material 140, for example soda glass, which excludes the substance having a refractive index equal to either ordinary light or extraordinary light; where the relationship described in the following formula is established among a refractive index (ne) of the filling material, an ordinary light refractive index (no) of the birefringent material, and an extraordinary refractive index (ne), as described in our Japanese patent application Hei 6-100668 in detail while the polarized component of a returning beam can be configured to transmit.

$nc=no+m(no-ne):(m=\pm1, \pm2, \pm3...)$ $=ne+L(no-ne):(L=\pm1, \pm2, \pm3...)$

Next, FIG. 13 is a basic schematic configuration illustrating the optical pickup head apparatus of the second example of this invention. The same components as in FIG. 1 of the first example are coded in the same way.

The difference in the optical pickup head apparatus between FIG. 1 in the first example and second example are that the beam splitter 100 is replaced with a polarized beam splifter and the holographic optical element 22 described previously is arranged between the polarized beam splitter 100 and the λ/4 plate 90. The semiconductor laser 11 is arranged so that the polarized surface of a interrogating beam is perpendicular to the paper surface. Since this interrogating beam is S-polarized with respect to the polarized beam splitter 100, most light beam energy is reflected by the polarized beam splitter and goes to the holographic optical element 22. The holographic optical element 22, as described above, is configured to diffract ordinary light and not to diffract extraordinary light; its orientation points the direction of the paper. Therefore, the interrogating beam emitted from the semiconductor laser 11 is normal light for the holographic optical element 22, and is split into five beams as mentioned above. These five beams turn into circularly polarized beams when they are transmitted through the λ/4 plate 90, and are condensed on the disk 15 through the objective lens 14. The reflected beam with varied intensity according to recorded information, again, passes through the objective lens 14, and is transmitted through the λ/4 plate 90 to reach the holographic optical element 22 while it is being transformed into a polarized beam of a polarized surface which is parallel to the paper surface.

This returning beam is an extraordinary light for the holographic optical element 22 and unwanted diffracted beams are not generated. Furthermore, this returning beam is a P-polarized beam to the polarized beam splitter 100, and the five beams do not reflect but are transmitted by the polarized beam splitter 100 to reach the photodetector 16.

Therefore, even if an optical pickup head apparatus is configured as such, it is apparent that the same effect as the previous example can be obtained. In addition, the polarized beam splitter provides higher light beam energy efficiency compared to the half mirror 13 in the first example; as a result, the usable life for the semiconductor laser 11 may be increased by means of decreasing the driving current; the energy consumption for the entire system may be decreased.

Moreover, the holographic optical element 22 is arranged so that its surface is nearly perpendicular to the optical axis of the objective lens 14. For this reason, the effect of astigmatism generated when a beam passes through the holographic optical element 22 at slope (according to FIG. 1) of the first example can be reduced, consequently, improving detected properties. Furthermore, when a half mirror 13 comprising a parallel flat plate (see FIG. 1), as in the first example, is applied to the configuration, a beam generates astigmatism when it passes through the half mirror 13 comprising the parallel flat plate, encountering a problem. However, when the optical pickup head apparatus is configured as this example, no astigmatism is generated, thus stabilizing detected properties.

FIG. 14 illustrates the schematic configuration of the optical pickup head apparatus of a third example. The same components as in the previous examples are coded the same. In the optical pickup head apparatus of this third example, the holographic optical element 22 is arranged between an entire reflection mirror 23 and a λ/4 plate 90. Therefore, the transmitting beam emitted from the semiconductor laser 11 has the entire reflection mirror 23 set up in its optical path; it is guided to the holographic optical element 22, diffracted by the holographic optical element 22, and split into five beams; the five beams are guided to the objective lens 14 via the λ/4 plate 90 and are condensed to form five beam spots on the recording surface of the laser disk 15. Then, each of the five beam spots is reflected at the laser disk 15 and passes through the λ/4 plate 90 via the objective lens 14 again while its polarized surface is rotated by 90° by means of the λ/4 plate 90. The five beam spots are transmitted through the holographic optical element 22 directly maintaining as they are to reach the entire reflection mirror 23.

At this point, in this example, the RF signal component is detected by a self coupled optical pickup (scoop) method. That is, a main beam of a magnitude modulated by the recorded information on the disk is the 0 order beam on both the interrogating and returning paths, thus it does not diffract. In addition, because the entire reflection mirror 23 is used, the main beam returns to the active layer of the semiconductor laser 11 and changes the oscillated status of the semiconductor laser 11 according to the recorded information, consequently changing the light beam output of the semiconductor laser 11. The RF signal component can be detected by a so called "monitor photodetector (55a)" which is normally used to control the beam output of the semiconductor laser 11. Also, these four sub-beams are detected by four of 2-division photodetector elements of the same kind as those used in FIGS. 5 and 6, which are arranged to sandwich the semiconductor laser 11.

Note that, in FIG. 14 and FIG. 15 described later, a set of photodetector elements 56a, 56b, 57a, and 57b and another set of photodetector elements 58a, 58b, 59a, and 59b are illustrated integrally. In reality, they are separated into four beams as illustrated in FIGS. 5 and 6.

Therefore, even if an optical pickup head apparatus is configured as such, it is apparent that the same effect as in the aforementioned second example will result. In addition, the semiconductor laser 11, which functions as a light source, and the photodetector 16 can be positioned closely by the scoop method; consequently, as illustrated in FIG. 14, they can be housed in a single package 80. In this way, the number of tuning places is reduced, enabling one to reduce manufacturing cost and to increase productivity.

Moreover, an entire reflection mirror 23 is formed for bending the optical path between the semiconductor laser 11 and the objective lens 14 so that the thickness of the apparatus can be reduced because of the entire reflection mirror 23. As a result, it is possible for this optical pickup head apparatus to be built in a system such as a notebook type personal computer for which portability is critical.

Figure 15:
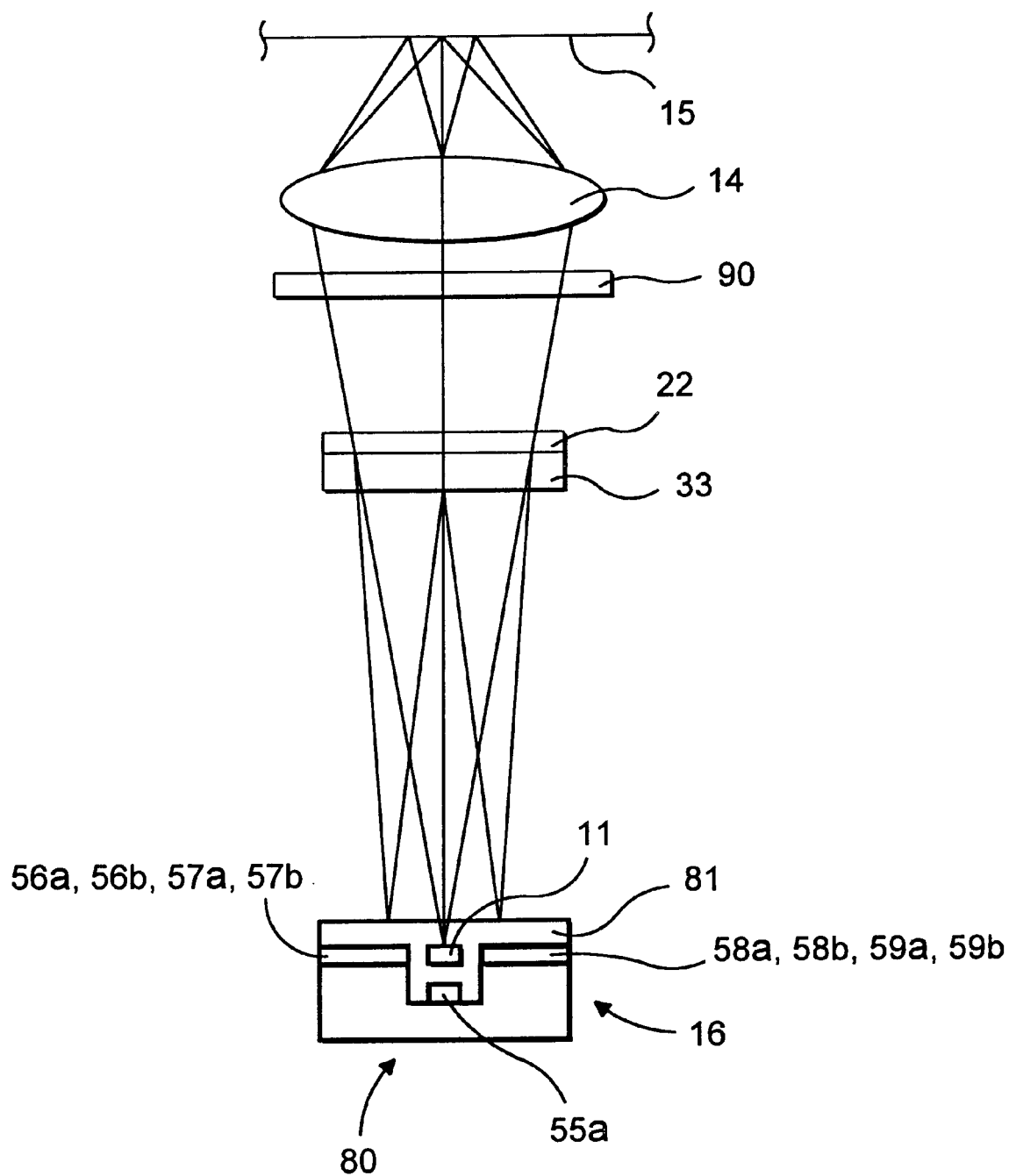
FIG. 15 illustrates a basic configuration of the optical pickup head apparatus of the fourth example of this invention.

FIG. 15 illustrates a schematic configuration of the optical pickup head apparatus of a fourth example of this invention. The same components as in the previous example are coded the same. In the optical pickup head apparatus of the fourth example, the semiconductor laser 11 (package 80) and the disk 15 are arranged in opposition each other. Between these are arranged, from the side of the semiconductor laser 11, the holographic optical element 22, the $\lambda/4$ plate 90, the objective lens 14 respectively. The holographic optical element 22 is formed on an optically transmittive substrate such as a glass substrate 33, which is almost perpendicular to the optical axis.

Therefore, the interrogating beam emitted from the semiconductor laser 11 passes through the glass substrate 33 and is split into five beams by the holographic optical element 22; the five beams are guided to the objective lens 14 via the $\lambda/4$ plate 90 and are condensed to form five beam spots on the recording surface of the laser disk 15. Then, each of the five beam spots is reflected at the laser disk 15, passes through $\lambda/4$ plate 90 via the objective lens 14 again while its polarized surface is rotated by 90° by means of the $\lambda/4$ plate 90 and reaches the holographic optical element 22. The main beam returns to the semiconductor laser 11 via the glass substrate 33; the RF signal is detected by the RF-photodetector element 55a arranged on back of the semiconductor laser 11; sub-beams are detected by each two-division photodetector elements 56a, 56b, 57a, 57b, 58a, 58b, 59a, and 59b which are arranged to sandwich the semiconductor laser 11. That is, the scoop method is used for detection in this fourth example as well.

In the above examples, for example, coating at least one side of the optical elements including the holographic optical element 22, that is, at least either one of the exposed surface of the holographic optical element 22 and the exposed surface of the half mirror 13, in terms of optical element illustrated in FIG. 1, with anti-reflection layer for reflection prevention, can increase the light beam energy efficiency, decrease the driving amperes for the semiconductor laser, and increase the usable life of the semiconductor laser 11, or decrease the energy consumption of the entire system.

Also, coating at least one side of at least one of the holographic optical element 22 and the $\lambda/4$ plate 90 as illustrated in FIGS. 13 to 15 with an anti-reflection layer for reflection prevention can increase the light beam energy efficiency.

In addition, as illustrated in FIGS. 14 and 15, sealing the semiconductor laser 11 and the photodetector 16 in a cover glass 81 of transparent material and coating the surface of the cover glass 81 with an anti-reflection layer, can also increase the light beam energy efficiency as above.

Furthermore, forming the holographic optical element 22 and the $\lambda/4$ plate 90 integrally, front to back, as illustrated in FIGS. 13 to 15 (In FIG. 15, the glass substrate 33 can be integral as well can reduce the number of components, simplify the structure, reduce the manufacturing cost, and improve the productivity. When the holographic optical element 22 and the $\lambda/4$ plate 90 are formed integrally, front to back, it is preferable that the $\lambda/4$ plate 90 and the holographic optical element 22 are made from the same material; for example, rutile type titanium oxide, polydiacetylene, calcite, quartz or lithium niobate are preferable materials. When the holographic optical element 22 and the $\lambda/4$ plate 90 are constructed of the same material, they can be manufactured in the same manufacturing system, simplifying their manufacturing process and consequently reducing their manufacturing cost. Even when they are not formed integral, front to back, it is apparent that making them from the same material can improve the effect. Also, coating at least one of the optical elements formed integrally, front to back, with an anti-reflection layer can also increase the light beam energy efficiency as the aforementioned.

Moreover, constructing the holographic optical element 22 and the $\lambda/4$ plate 90 of different materials wherein the holographic optical element 22 which requires grating processing and the $\lambda/4$ plate 90 which requires a precise control on thickness are made from an appropriate material can improve the total system performance.

Furthermore, fixing the holographic optical element 22, the $\lambda/4$ plate 90, the semiconductor laser 11, and the photodetector 16 in a common enclosure (e.g. hollow cylinder: not illustrated) can reduce the manufacturing cost and improve productivity; wherein the enclosure is rotatable in the optical axis direction and around the optical axis; for example, the positional adjustment of .the spots formed on the disk 15 is done by rotating the enclosure; the rotational adjustment for the holographic optical element 22 and the photodetector 16 is made easier while other adjustments are also made easier compared to the method in which the holographic optical element 22 and the photodetector 16 are rotated independently during adjustment; the entire structure is simplified and the number of tuning places is decreased.

Next, in FIG. 16, another example using the holographic optical element 222 of this invention is illustrated. In this example, the holographic optical element 222 is configured so that a pair of diffraction gratings, for example, on a half mirror 213 as a beam splitter; is split by a split line 222D, generally on the optical axis in the direction orthogonal to the direction in which the track 125 on the disk 15. Using this split line 222D as a border, a pair of diffraction gratings have different diffraction conditions, that is, grating distance varies on both sides of the split line 222D to provide different diffraction conditions; for example, the grating pitch for the diffraction grating 222B is set to a half of that of the diffraction grating 222A; at the same time, they have the diffraction gratings 222A and 222B formed in a shape of saw teeth that are arranged in opposition; wherein the saw teeth are arranged in opposite directions on each side of the split line 222D which points almost in the same direction as the track of the disk 15 runs.

In this example, the diffraction gratings of saw teeth constitute the counter measure of this invention for diffracted beams to prevent generating unwanted diffracted beams. The diffraction gratings formed of saw teeth can concentrate diffracted beams on a specific order according to the angle of the saw teeth (blaze angle), that is, the magnitude of diffraction in the direction of the slope of the saw tooth can be intensified. As a result, the 0 order and, for example, +1 order diffracted beams (A+1 diffracted beams) are generated at the diffraction grating 222A (the −1 order diffracted beam is not generated); the 0 order and, for example, the −1 order diffracted beams (B−1 diffracted beams) are generated at the diffraction grating 222B (the +1 order diffracted beam is not generated). In other words, because the A−1 order and the B+1 order diffracted beams are not generated; on the disk 15, as illustrated in FIG. 17, there are three beams that are the 0 order, the A+1 order and the B−1 order diffracted beams; on the side of the photodetector, 17 beams are reduced to 7 beams, as illustrated in FIG. 18, and overlapping of diffracted beams is completely eliminated.

Figures 18, 19:
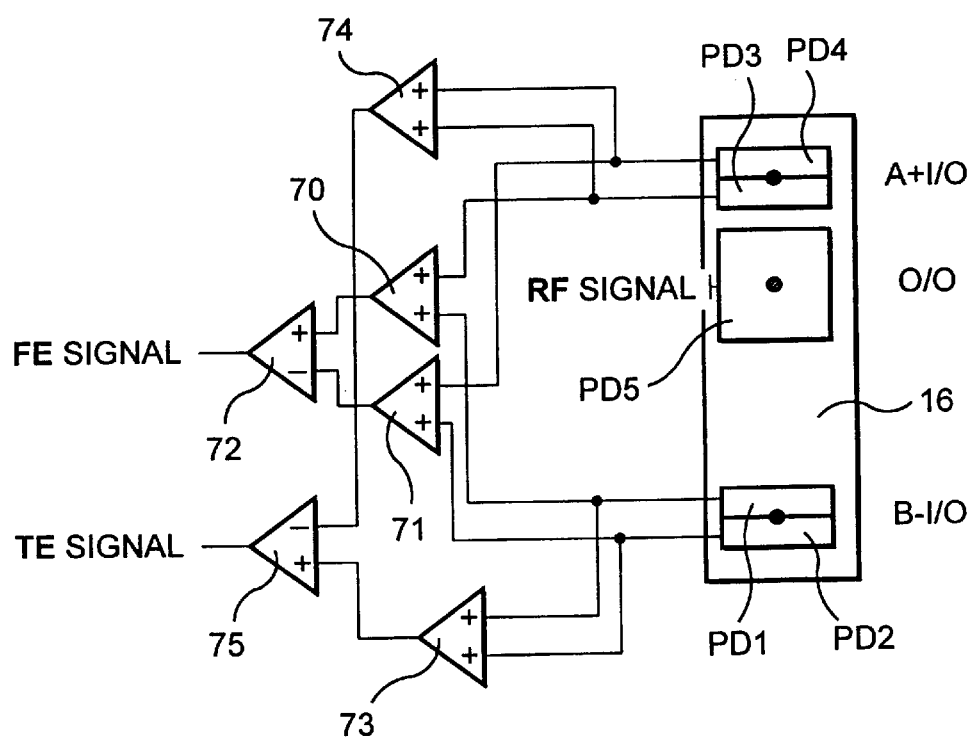
FIG. 18 is a diagram illustrating the status of beam spots on the side of a photodetector when using the holographic optical element of FIG. 16.
FIG. 19 is a circuit diagram illustrating the arrangement of the photodetector and the status of interconnects for obtaining RF, FE and TE signals from the output of each element of the photodetector when using the holographic photodetector of FIG. 16.

In addition, as illustrated in FIG. 19, RF-photodetector element PD5, two division photodetector elements PD1 and PD2, and two division photodetector elements PD3 and PD4 are positioned on a desired beam spot position on the photodetector 16; 0/0 which is the 0 order for both interrogating and returning beams is positioned at RF-photodetector element PD5, A+1/0 is positioned on the split line for the two division photodetector elements PD3 and PD4, and B−1/0 is positioned on the split line for two-division photodetector elements PD1 and PD2. With this arrangement, only needed beam spots are detected while completely eliminating overlapping of diffracted beams.

In this example, the FE and TE signals are obtained by arranging the outputs of each of the photodetector elements PD5, PD1, PD2, PD3, and PD4 which constitute the photodetector 16, as illustrated in FIG. 19. That is, the FE signal is obtained by adding the outputs from the two division photodetector elements PD1 and PD3 and the outputs from the two division photodetector elements PD2 and PD4 by means of the adding apparatus 70 and 71, and interconnecting these with a comparator 72 to compare the results. On the other hand, when detecting the tracking error, the same procedure as the popular 3-beam method is used. The TE signal is obtained by adding the outputs from the two division photodetector elements PD1 and PD2, the outputs from the two division photodetector elements PD3 and PD4 by means of the adding apparatus 73 and 74, and interconnecting these with a comparator 75 to compare the results. Also the RF signal is detected by means of the RF-photodetector element PD5. With this arrangement, only the diameter of the 0 order beam fluctuates according to the level of focusing, the photodetector element dead zone, which affects the example of conventional technology, no longer affects the detection.

In addition, especially in the above example, the holographic optical element 222 which beams pass through twice both ways consists of the diffraction gratings 222A and 222B which are self coupled near the optical axis; wherein these diffraction gratings 222A and 222B are formed of saw teeth and each of them are arranged in opposition and are stepped linearly almost along the direction of the recording track of the disk 15; and the diffraction gratings 222A and 222B have different pitches. The diffraction gratings are configured so that one diffraction grating 222A generates the 0 order beam and, for example, A+1 order beam; the other diffraction grating 222B generates the 0 order beam and, for example, A−1 order beam, thus three beams are directed onto the disk 15; overlapping of diffracted beams on the photodetector 16 is eliminated by removing unwanted diffracted beams. With this configuration, precise detection of error signals can be improved. Also, in this example, the optical pickup head apparatus is configured wherein the holographic optical element 222 is formed on the beam splitter 213; the fact that the holographic optical element 222 and the beam splitter 213 are formed integrally to reduce the number of components and to simplify the structure, reduces manufacturing cost and increases productivity.

In the above example, location sub-beams used is not equally spaced on the sides of the main (0 order) beam, as illustrated in FIG. 19, because the grating pitches for diffraction gratings 222A and 222B formed of saw teeth are different. However, it is preferable that sub-beams are equally distanced on the sides of the main (0 order) beam in view of the relationship with the tracking servo. That is, it is preferable that the grating pitches for the diffraction gratings 222A and 222B formed of saw teeth are almost equal. The status of beam spots under these conditions is described next.

Figure 20:
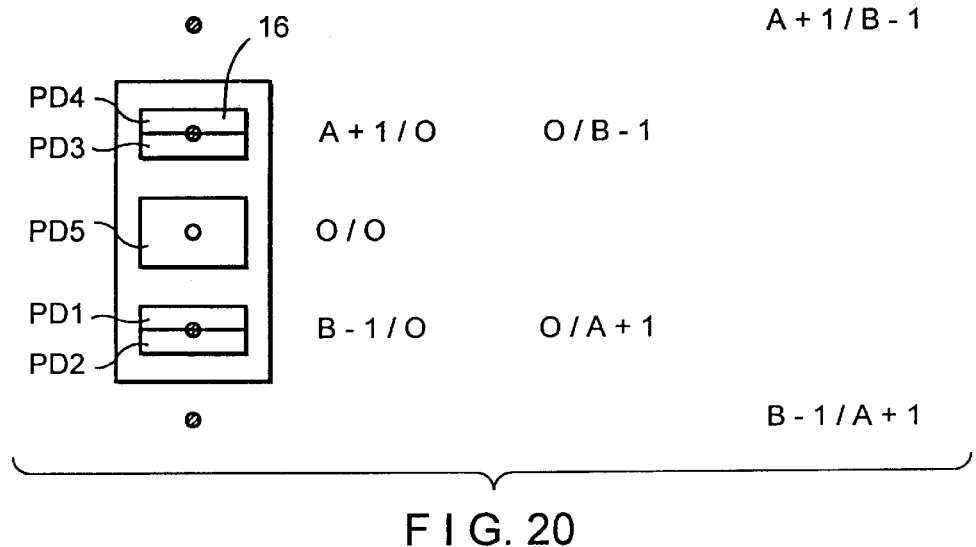
FIG. 20 is a diagram illustrating the status of beam spots of the side of the photodetector when the grating pitches for the two domains of the holographic optical element of FIG. 16 is set almost equal.

When the grating pitches for the diffraction gratings 222A and 222B formed of saw teeth are almost equal, the status of beam spots obtained on the side of the photodetector is illustrated in FIG. 20. In other words, as illustrated in FIG. 20, on the two division photodetector elements PD1 and PD2, the B−1/0 beam and the 0/A+1 beam for interrogating and returning overlap; on the two division photodetector elements PD3 and PD4, the A+1/0 beam and 0/B−1 beam overlap. However, the overlapped beam spots changes the same as displacement of the disk 15 so there is no problem in using B−1/0 and 0/A+1, and A+1/0 and 0/B−1 together. Regarding the TE signal, the 0/A+1 beams and the 0/B−1 beams do not have the TE information, therefore generate noise; which cannot be a problem because noise is canceled through the TE signal computation.

In other words, even if the grating pitches for the diffraction gratings 222A and 222B formed of saw teeth are almost equal, the chance of generating overlapping for diffracted beams on the photodetector 16 can be reduced. Regarding the FE detection, for example, overlapping that exists in some beam spots changes the same as needed diffracted beams, therefore, no noise is generated thereon; regarding TE detection, for example, can be canceled by computation and the like, so unwanted diffracted beams can be removed. With this configuration, precise detection of error signals can be improved.

Figure 21A:
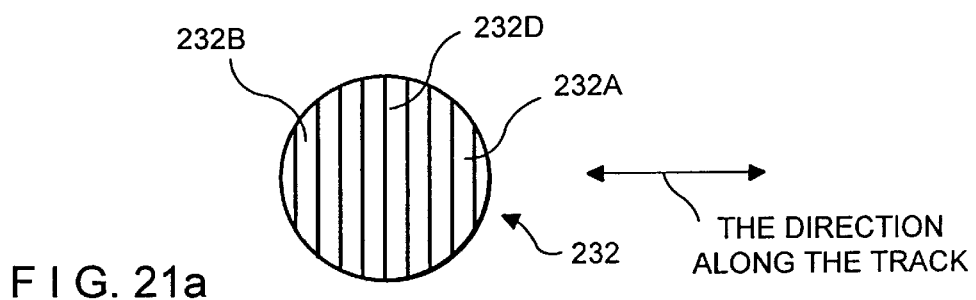
FIG. 21(a) is a front view and FIG. 21(b) is a bottom view (b) of another example of the holographic optical element of FIG. 16.
Figure 21B:
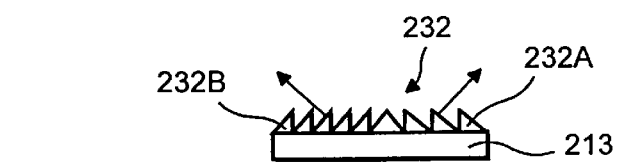

FIGS. 21(a), (b) and (c) illustrate another example of the holographic optical element 222 illustrated in FIG. 16; FIG. 21(a) is a front view; FIG. 21(b) is a bottom view. This holographic optical element 232 is formed, for example, on a half mirror 213 as a beam splitter; and it is split by a split line 232D, generally on the optical axis, in the direction orthogonal to the direction in which the track 125 on the disk 15 runs (the direction of the split line is orthogonal to that of the track). Using this split line 232 as a border, a pair of diffraction gratings have different diffractive conditions, that is, the grating distances are varied on both sides of the split line 222D to provide different diffractive conditions; for example, the grating pitch for the diffraction grating 222B is set to half of that of the diffraction grating 222A. At the same time, the diffraction gratings 222A and 222B are formed of saw teeth and are arranged in opposition. They are also stepped linearly almost along the direction of the track of the disk 15.

Figure 22:
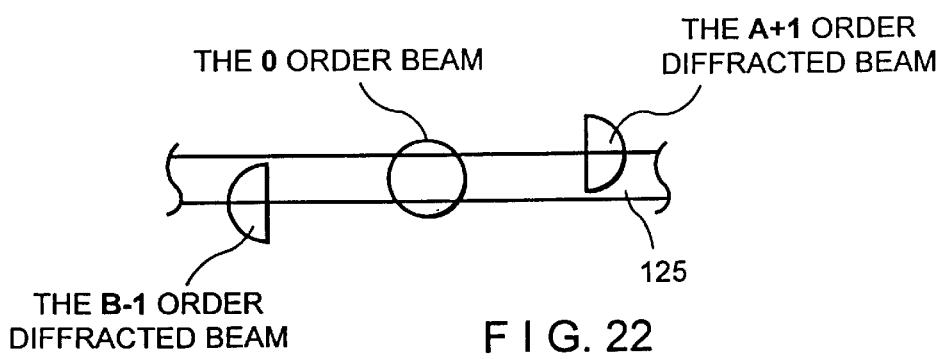
FIG. 22 is a plan view illustrating the status of three beam spots irradiated on the disk surface by means of the holographic optical element of FIG. 21.

Therefore, even with the holographic optical element 232 configured as such, diffracted beams are generated only in the direction of the slope formed on a saw tooth as mentioned above. On the disk 15, as illustrated in FIG. 22, there are three beams that are the 0 order, A+1 order, and B−1 order diffracted beams (wherein, the A+1 order and the B−1 order diffracted beams are obtained by rotating the beam spots by 90° and overlapping of diffracted beams is completely eliminated.

In other words, the same results as above can be obtained. Of course, even if the grating pitches for the diffraction gratings 222A and 222B formed of saw teeth are almost equal, the chance of generating overlapping diffracted beams on the photodetector 16 can be reduced. Regarding the detected FE, for example, overlapping that exists in some beam spots changes the same as needed diffracted beams, therefore, no noise is generated thereon; regarding the detected TE, for example, overlapping can be canceled by computation and the like, so unwanted diffracted beams can be removed; thus the same results as the aforementioned are obtained. Signal detection with little fluctuation, excellent in jitter property, is thus made possible. Also, the fact that the holographic optical element 232 and the half mirror 213 are formed integral, reduces manufacturing cost and increases productivity.

The holographic optical element 222 (or 232) is formed, for example, by attaching the diffraction gratings 222A and 222B (or 232A and 232B) formed of saw teeth. This process works in either step in which the diffraction gratings 222A and 222B (or 232A and 232B) formed of saw teeth are attached and then attached on the substrate 33, for example, or in which each of the diffraction gratings 222A and 222B (or 232A and 232B) are formed on each glass substrate.

The photopolymerization (2P) method is also effective. In other words, as illustrated in FIG. 23(a), an optical element can be obtained by forming the holographic optical element integral with the glass substrate 33, as illustrated in FIG. 23(b); wherein the shape of saw teeth corresponds to that of the diffraction gratings 222A and 222B (232A and 232B) on a pattern 76; the glass substrate 33 is arranged in opposition the surface of the saw teeth on the pattern (original plate) 76; between the pattern 76 and the substrate 33 space is filled, for example, with UV resin wherein the UV resin hardens upon UV radiation, then, the pattern 76 is removed.

Note that the glass substrate 33 can be replaced with a half or an entire reflection mirror.

The holographic optical element 222 (232) of the above example applies to the configuration of the diffraction grating, in which the diffraction gratings formed of saw teeth are stepped linearly almost along the direction of the recording track; as the wave length of the semiconductor laser 11 fluctuates, beam spots move in the same direction as the track runs. In this example, the holographic optical element 222, as illustrated in FIG. 16, is used and the split line 222D of the holographic optical element 222 is set to point almost the same direction as the track runs; also, as illustrated in FIGS. 24(a), (b) and (c), the split line for the two division photodetector elements PD1, PD2, PD3, and PD4 on the photodetector is conformed in the above direction.

Therefore, even if the beam spot moves due to the fluctuation of the wave length of the semiconductor laser 11, the beam spot moves in the direction along the track. For this reason it does not move to the other side of the two division photodetector elements PD1 and PD2, and PD3 and PD4. That is, referring to FIG. 24 (a), the beam spot on the two division photodetector element PD1 does not move to the two division photodetector element PD2; the beam spot on the two division photodetector element PD3 does not move to the two division photodetector element, thus reducing the influence from the fluctuation of wavelength.

However, even when the influence of fluctuation of wavelength is reduced with this configuration, by moving the objective lens 14 to follow the track, that is, by moving it orthogonal to the direction in which the track runs, the beam spot invades the other side of the two division photodetector element PD1, PD2, PD3, and PD4, as illustrated in FIG. 24(b), causing the "offset focus".

Figure 25:
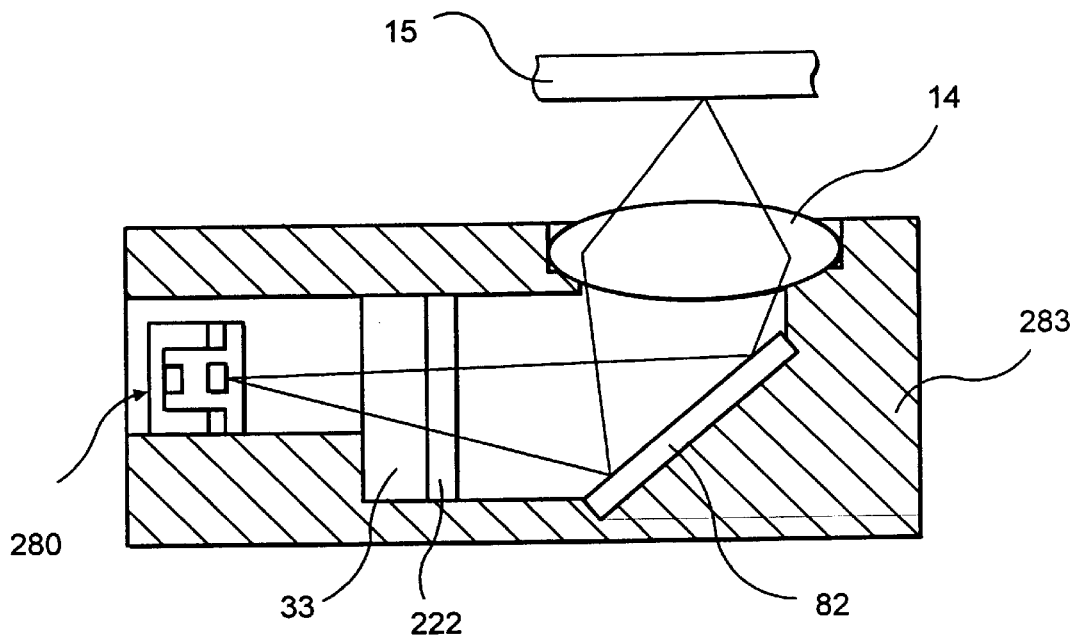
FIG. 25 is a basic configuration illustrating an example of the optical pickup head apparatus installed in a housing of this invention.
Figure 26:
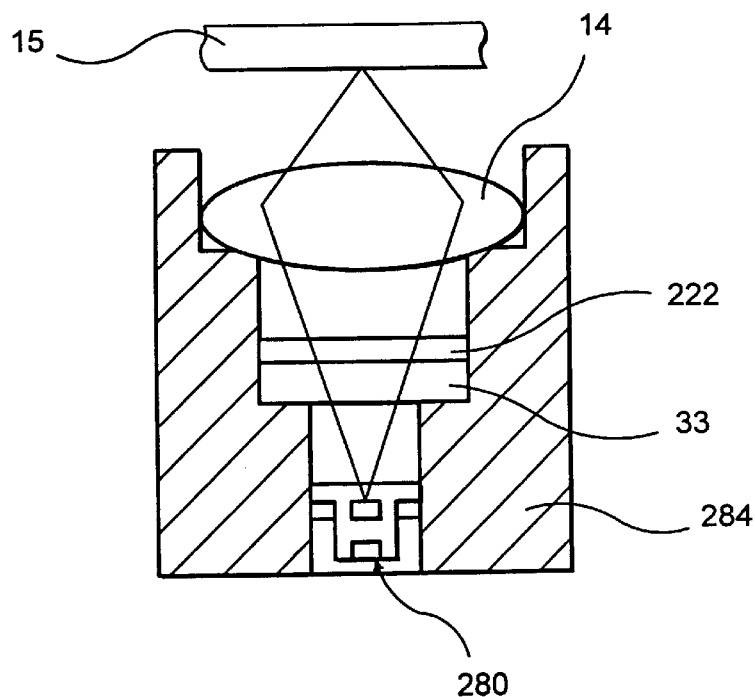
FIG. 26 is a basic configuration illustrating another example of the optical pickup head apparatus of this invention installed in a housing.

For resolution, in this example as illustrated in FIG. 25, with an objective lens 14, the optical element comprising a holographic optical element 222 and a glass substrate 33, a semiconductor laser 11 and a photodetector 16 are put together in a package 280; wherein the package is held integrally by a housing 283 which is movable to the focusing and tracking directions. When following the aforementioned track, not only the objective lens 14 but also the housing 283 moves, that is, the optical element and the package 280 moves in the same direction so the above "offset focus" is not encountered.

Note that, in FIG. 25, a semiconductor laser 11 and the disk surface 1 5 are arranged orthogonal to each other with a mirror 82 positioned for directing a beam from the semiconductor laser 11; this start up mirror 82 is in the status in which it is retained in the above housing 283. In addition, an optical element comprising the holographic optical element 222 and the transmissive substrate 33 can be arranged between the startup mirror 82 and the objective lens 14.

Also note that this structure, that is, the structure in which not only the objective lens 14 but also the optical element including the holographic optical element, the semiconductor laser 11, the photodetector 16 are held integrally by the housing 283, can be applied to the examples illustrated in FIGS. 1 and 14.

FIG. 20 illustrates another configuration to prevent the "offset focus." In this example, not only an objective lens 14 but also an optical element comprising a holographic optical element 222 and a glass substrate 33, a semiconductor laser 11, and the photodetector 16 are put together in a package 280 to be held integrally by a housing 284.

It is apparent that this configuration also provides the same effect as illustrated in FIG. 25. In addition, the location of a beam spot formed on a track of the disk 15 can be adjusted by rotating the housing 284 by using the optical axis as its core shaft, which makes adjustment, of the beam spot location easier than the conventional technology, in which the holographic optical element and the photodetector are rotated independently. Consequently, this configuration reduces manufacturing cost and improves productivity.

In the above examples, the optical pickup for an laser disk was described, however, this invention is applicable to a magneto-optical disk.

As described above, according to the optical pickup head apparatus of this invention, its configuration improves precise detection of error signals and increases light beam energy efficiency; wherein a diffracted beam generation prevention means for preventing unwanted diffracted beams from a recording medium is found; that is, a λ/4 plate is arranged between an objective lens and a holographic optical element through which a beam passes twice when interrogating and returning; a pair of diffraction gratings having different diffractive conditions by the split line being a border, which splits the element near the optical axis into two parts arranged in opposition. The polarized components emitted from a light source are diffracted by means of these diffraction gratings while the polarized component of a returning beam having a polarized surface rotated by 90° is transmitted by means of the λ/4 plate so that five beams diffracted on interrogating do not diffract on returning but transmit to be guided to a photodetector or a light source; it is configured to diffract beams on interrogating only and to eliminate unwanted diffraction generation.

Also according to the optical pickup head apparatus of this invention, its configuration improves the precise detection of error signals, wherein the diffraction grating which is split into two near the optical axis is formed on the holographic optical element through which a beam passes twice when interrogating and returning; this optical pickup head apparatus for prevents unwanted diffracted beams, that is, it is configured to remove unwanted diffracted beams. These diffraction gratings formed of saw teeth having a slope are arranged in opposition and are stepped linearly almost along the direction of the recording track. One side of the diffraction gratings generates the 0 order and, for example, a+1 order beam while the other side generates the 0 order and, for example, a−1 order beam to generate three beams on the recording media thus reducing or eliminating overlapping of diffracted beams at a photodetector.

While the foregoing description and drawings represent the preferred embodiments of the present invention, it will be obvious to those skilled in the art that various changes and modifications may be made therein without departing from the true spirit and scope of the present invention.

We claim:

1. An optical pickup head apparatus, comprising:
    a holographic optical element;
    an objective lens;
    a λ/4 plate arranged between said holographic optical element and said objective lens, said holographic optical element being equipped with a pair of diffraction gratings having different diffractive conditions wherein said element is split in two by a split line near the optical axis as a border; said diffraction gratings for diffracting the polarized component emitted from a light source; the polarized component of a returning beam having a polarized surface which is rotated by 90° by said λ/4 plate being transmitted;
    wherein said optical pickup head apparatus for reading information signals irradiates a beam emitted from said light source onto a recording medium via said holographic optical element and said objective lens; beams reflected from said recording medium being guided to a photodetector via said objective lens and said holographic optical element; and
    means for returning a reflection from said recording medium to said light source via said objective lens, λ/4 plate, and holographic optical element;
    for detecting a change in oscillated status of a light source, which is caused by a returned beam modulated according to recorded information, by photodetector elements on the back of said light source as a change in magnitude of a beam emitted from a light source; and
    for reading said recorded information.

2. The optical pickup head apparatus according to claim 1, wherein said light source and photodetector are closely arranged and contained in the same package.

3. The optical pickup head apparatus according to claim 2, wherein said package in which said photodetector and said light source are contained is sealed by a transparent material and an anti-reflection layer is coated on said transparent material surface.

4. The optical pickup head apparatus according to claim 3, wherein said holographic optical element, λ/4 plate, light source, and photodetector are fixed in a common enclosure while said enclosure is made rotatable in the optical axial direction and about the optical axis.

5. In an optical pickup head apparatus for reading information signals from a recording medium having a laser beam light source, an objective lens and a photodetector, the improvement comprising:
    a holographic optical element constructed of a pair of diffraction gratings having different diffractive conditions wherein the element is split into two by a split line near its optical axis as a border; and
    a diffraction generation prevention means for preventing the generation of unwanted diffracted beams reflected from a recording medium;
    wherein the optical pickup head apparatus irradiates a laser beam emitted from said light source onto a recording medium via said holographic optical element and said objective lens; beams reflected from the recording medium being guided to said photodetector via said objective lens and said holographic optical element, and
    wherein said pair of diffraction gratings having said different grating conditions diffract a beam from said light source into five beams to irradiate them onto said recording medium; wherein said photo detector comprises five photodetector units which detect said five beams; and wherein said five photodetector units use one photodetector unit as a data signal reproduction photodetector unit and put out a focus and tracking error signals by the remaining four photodetector units.

6. The optical pickup head apparatus according to claim 5, wherein said holographic optical element is formed on an optically isotropic substrate with periodic concavo-convex gratings made from a birefringent material; the concavities of said periodic concavo-convex gratings being filled with a substance having a diffractive index equal to either an ordinary beam diffractive index or an extraordinary beam diffractive index; wherein said holographic optical element transmits the polarized component of a returning beam.

7. The optical pickup head apparatus according to claim 6, wherein said birefringent material is selected from the group consisting of polydiacelylene, calcite, quartz, lithium niobate, and rutile phase titanium oxide.

8. The optical pickup apparatus according to claim 6, wherein said data signal reproduction photodetector unit is constructed of one photodetector element while said remaining four photodetector units are constructed of two division photodetector elements.

9. The optical pickup apparatus according to claim 5, wherein said holographic optical element comprises an optically anisotropic substrate formed with periodic concavo-convex gratings made from a birefringent material, wherein a pitch between a concavity and convexity of said periodic concavo-convex gratings is set to make either one of ordinary light phase contrast or the extraordinary light phase contrast an even multiple of n so that a polarized component of a returning beam is transmitted.

10. The optical pickup head apparatus according to claim 5, wherein an optically isotropic substrate having periodic concavo-convex gratings on its surface and a birefringent material layer made from a birefringent material formed at least on the convexity of said optically isotropic substrate, wherein said birefringent material layer thickness and a depth of a concavity formed on said optically anisotropic substrate are set so as to make either the ordinary light phase contrast or the extraordinary light phase contrast between the concavities and convexities formed from said optically isotropic substrate and the birefringent material layer an even multiple of $\pi$, so that a polarized component of a returning beam is transmitted.

11. The optical pickup head apparatus according to claim 5, wherein said holographic optical element is constructed by forming a periodic concavo-convex grating made from a birefringent material on an optically anisotropic substrate and filling a substance in a concavity of said periodic concavo-convex gratings wherein a refraction index (nc) of said filling substance and an ordinary light refraction index (no) and an extraordinary light refraction index (ne) of said birefringent material layer have the following relationship $$nc = no + m(no-ne); (m = \pm 1, \pm 2, \pm 3 \ldots)$$

$$= ne + L(no-ne); (L = \pm 1, \pm 2, \pm 3 \ldots)$$

so that a polarized component of a returning beam is transmitted.

* * * * *